(12) United States Patent
Minamino

(10) Patent No.: US 10,178,305 B2
(45) Date of Patent: Jan. 8, 2019

(54) IMAGING APPARATUS AND METHOD TO CAPTURE IMAGES BASED ON RECOMMENDED APPLICATIONS

(71) Applicant: SONY CORPORATION, Tokyo (JP)

(72) Inventor: Takanori Minamino, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/405,556

(22) PCT Filed: Apr. 3, 2013

(86) PCT No.: PCT/JP2013/060210
§ 371 (c)(1),
(2) Date: Dec. 4, 2014

(87) PCT Pub. No.: WO2013/187108
PCT Pub. Date: Dec. 19, 2013

(65) Prior Publication Data
US 2015/0130960 A1    May 14, 2015

(30) Foreign Application Priority Data
Jun. 13, 2012   (JP) .................................. 2012-133788

(51) Int. Cl.
*H04N 1/00* (2006.01)
*H04N 5/232* (2006.01)
*G06K 9/00* (2006.01)

(52) U.S. Cl.
CPC ..... *H04N 5/23225* (2013.01); *H04N 1/00183* (2013.01); *H04N 1/00244* (2013.01); *H04N 5/23206* (2013.01); *H04N 5/23222* (2013.01); *G06K 9/00664* (2013.01); *H04N 5/23245* (2013.01)

(58) Field of Classification Search
None
See application file for complete search history.

(56) References Cited

U.S. PATENT DOCUMENTS

| | | | | |
|---|---|---|---|---|
| 5,239,333 A | * | 8/1993 | Takagi | G03B 7/09979 396/234 |
| 2004/0208475 A1 | * | 10/2004 | Ohmura | H04N 1/00183 386/224 |
| 2007/0064121 A1 | * | 3/2007 | Issa | G06Q 30/02 348/231.2 |
| 2010/0146442 A1 | * | 6/2010 | Nagasaka | G06Q 10/10 715/810 |
| 2011/0093580 A1 | * | 4/2011 | Nagasaka | G06F 8/60 709/223 |
| 2011/0131529 A1 | * | 6/2011 | Doi | G06F 9/445 715/810 |

(Continued)

FOREIGN PATENT DOCUMENTS

| | | |
|---|---|---|
| JP | 2003-008977 A | 1/2003 |
| JP | 2003-101987 A | 4/2003 |

(Continued)

*Primary Examiner* — Justin P. Misleh
(74) *Attorney, Agent, or Firm* — Chip Law Group

(57) ABSTRACT

Provided is a recommendation apparatus including a determination unit configured to determine an application to be recommended to an imaging apparatus, based on information on an image selected in accordance with an operation mode of the imaging apparatus.

13 Claims, 10 Drawing Sheets

(56) References Cited

U.S. PATENT DOCUMENTS

| | | | | |
|---|---|---|---|---|
| 2011/0246561 A1* | 10/2011 | Eshima | .................. | G06Q 30/02 |
| | | | | 709/203 |
| 2012/0084292 A1* | 4/2012 | Liang | ................ | G06F 17/30899 |
| | | | | 707/741 |
| 2012/0110601 A1* | 5/2012 | Spencer | .............. | G06F 9/45504 |
| | | | | 719/328 |
| 2012/0303477 A1* | 11/2012 | Ben-Itzhak | ............ | G06Q 30/02 |
| | | | | 705/26.7 |
| 2013/0051615 A1* | 2/2013 | Lim | ........................ | G06F 3/005 |
| | | | | 382/103 |

FOREIGN PATENT DOCUMENTS

| | | |
|---|---|---|
| JP | 2004-112054 A | 4/2004 |
| JP | 2004-112485 A | 4/2004 |
| JP | 2009-140341 A | 6/2009 |
| JP | 2010-157207 A | 7/2010 |

* cited by examiner

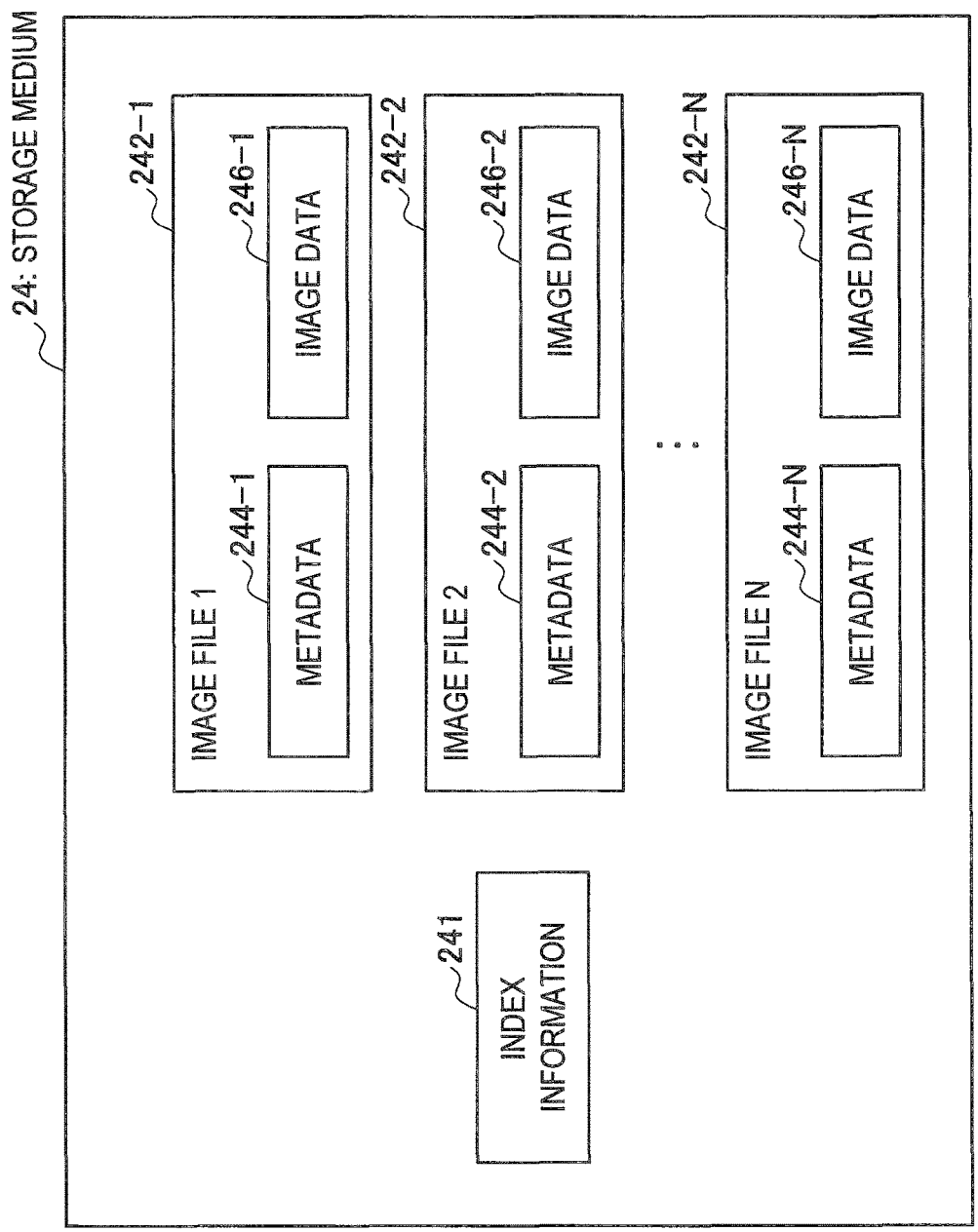

FIG.5

STILL IMAGE METADATA 244A

| FACIAL INFORMATION | FACE 1 (x,y,w,h)<br>FACE 2 (x,y,w,h) |
|---|---|
| CAPTURE MODE | FULL AUTO/ PROGRAMMED AUTO/ APERTURE PRIORITY/ SHUTTER SPEED PRIORITY/ MANUAL |
| CONSECUTIVE SHOOTING | YES(CONSECUTIVE CAPTURING GROUP ID)/ NO |
| PHOTO TREATMENT | YES/ NO |
| POSITIONAL INFORMATION | LATITUDE/ LONGITUDE |

MOTION IMAGE METADATA 244B

| FACIAL INFORMATION | FACE 1 (x,y,w,h), time stamp<br>FACE 2 (x,y,w,h), time stamp |
|---|---|
| CAPTURE MODE | FULL AUTO/ PROGRAMMED AUTO/ APERTURE PRIORITY/ SHUTTER SPEED PRIORITY/ MANUAL |
| POSITIONAL INFORMATION | REPRESENTATIVE POSITION (LATITUDE/ LONGITUDE)<br>  LATITUDE/ LONGITUDE 1, timestamp<br>  LATITUDE/ LONGITUDE 2, timestamp<br>  LATITUDE/ LONGITUDE 3, timestamp<br>  LATITUDE/ LONGITUDE 4, timestamp |

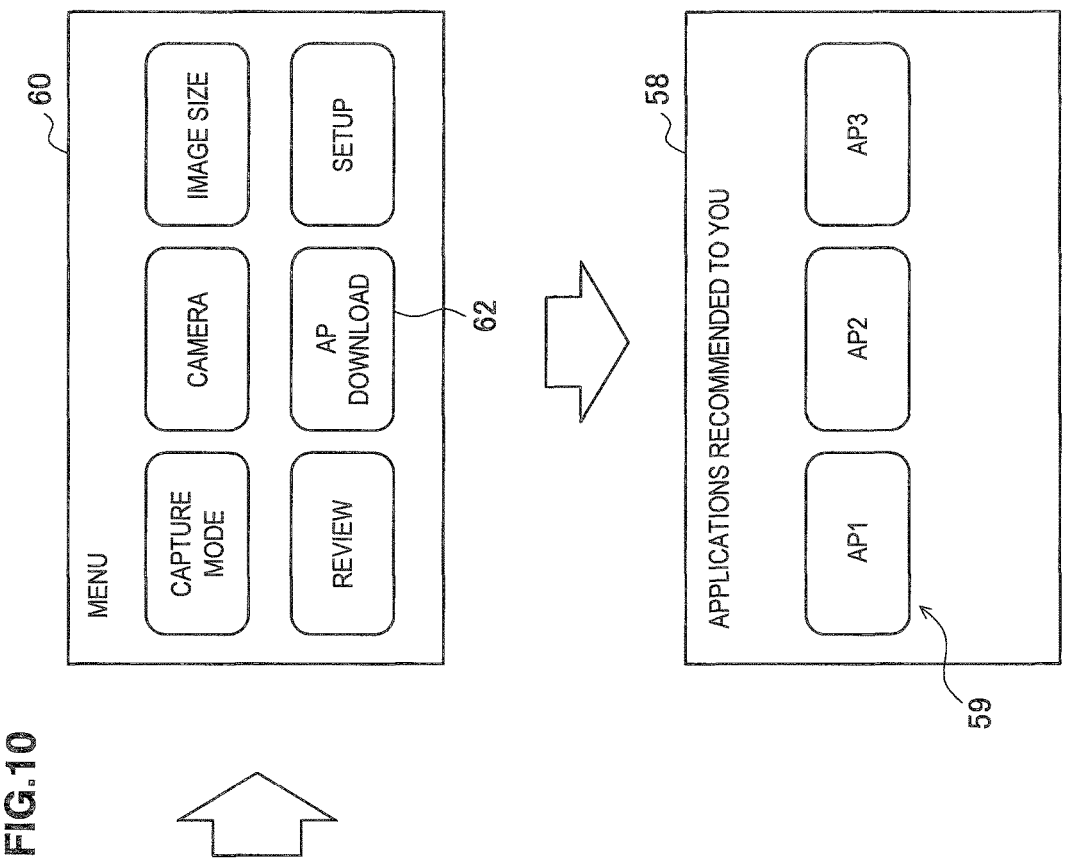
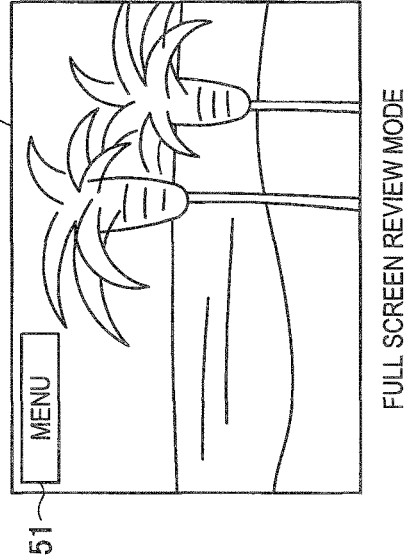
FIG.10

IMAGING APPARATUS AND METHOD TO CAPTURE IMAGES BASED ON RECOMMENDED APPLICATIONS

TECHNICAL FIELD

The present disclosure relates to a recommendation apparatus, method, and program.

BACKGROUND ART

With regard to software extension for electronic devices, a mainstream way of extension in recent years has been for a user to select a favorite application from a vast amount of applications, as represented by downloading an application to a smartphone. In addition, since it is difficult to select a favorite application from the vast amount of applications, in downloading an application to a smartphone, techniques such as keyword search and presentation of related applications are used to reduce a burden on a user.

As an application providing technique for reducing a burden on a user, a content providing apparatus described in Patent Literature 1 below is also known. The content providing apparatus described in Patent Literature 1 estimates a psychological state of the user based on applications and contents that the user is currently using, and determines a content to recommend according to the estimated psychological state.

CITATION LIST

Patent Literature

Patent Literature 1: JP 2009-140341A

SUMMARY OF INVENTION

Technical Problem

Here, the software extension by downloading an application is practiced, not only in the smartphone as described above, but also in electronic devices such as digital cameras and game machines. With regard to an application for a digital camera, in particular, a suitable application varies depending on a use state of the digital camera such as whether a user is currently capturing or reviewing an image, or depending on what kind of image the user wants to capture.

However, with the above-described methods such as keyword search or recommendation on the basis of applications that the user is currently using, it has been difficult to recommend a suitable application that varies depending on a use state of the digital camera or a desired captured image as described-above.

Therefore, the present disclosure proposes a novel and improved recommendation apparatus, method, and program capable of recommending an application suitable for a situation.

Solution to Problem

According to the present disclosure, there is provided a recommendation apparatus including a determination unit configured to determine an application to be recommended to an imaging apparatus, based on information on an image selected in accordance with an operation mode of the imaging apparatus.

According to the present disclosure, there is provided a recommendation method including a step of selecting an image in accordance with an operation mode of an imaging apparatus, and a step of determining an application to be recommended to the imaging apparatus based on information on the image selected by the step of selecting.

According to the present disclosure, there is provided a program for causing a computer to execute processing of selecting an image in accordance with an operation mode of an imaging apparatus, and processing of determining an application to be recommended to the imaging apparatus based on information on the image selected by the processing of selecting.

Advantageous Effects of Invention

According to the present disclosure, as described above, it becomes possible to recommend an application suitable for a situation.

BRIEF DESCRIPTION OF DRAWINGS

FIG. 4 is an explanatory diagram illustrating an example of information stored in a storage medium according to the embodiment.

FIG. 5 is an explanatory diagram illustrating a specific example of metadata according to the embodiment.

FIG. 10 is a screen transition diagram when an AP download is instructed from a MENU screen.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Description will be made in the following order.
1. Outline of Recommendation System According To Embodiment of Present Disclosure
2. Basic Configuration
2-1. Configuration of Imaging Apparatus
2-2. Configuration of Server
3. Operation Processing
4. Summary <1. Outline of Recommendation System According To Embodiment of Present Disclosure>

Figure 1:
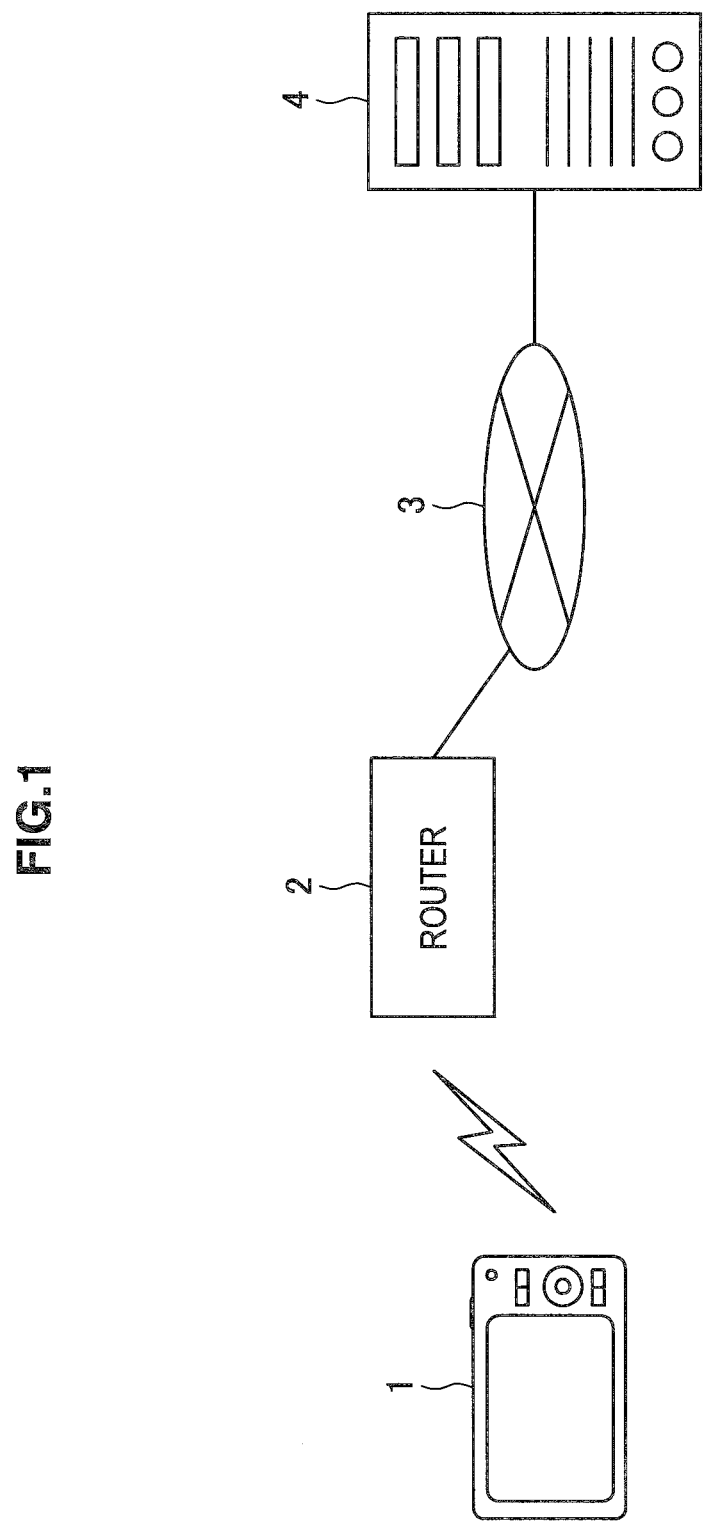
FIG. 1 is a diagram for explaining an outline of a recommendation system according to an embodiment of the present disclosure.

First, an outline of a recommendation system according to an embodiment of the present disclosure will be described with reference to FIG. 1. As illustrated in FIG. 1, the recommendation system according to the embodiment of the present disclosure includes an imaging apparatus 1 and a server 4. The imaging apparatus 1 wirelessly connects to a router 2, and transmits and receives data to and from the server 4 through network 3.

In the recommendation system, the imaging apparatus 1 according to this embodiment selects a given image according to an operation mode, and transmits metadata, etc. of the selected image to the server 4. The server 4 determines an application to recommend based on the metadata, etc. transmitted from the imaging apparatus 1 and transmits the application to the imaging apparatus 1.

Here, the operation modes of the imaging apparatus 1 include a capture mode for capturing a still image or a motion image, and a review mode for displaying on a display unit a storage image stored in memory. In the capture mode, as a user is trying to capture a scene or a subject, the user hopes that an application related to a capturing operation is recommended. Meanwhile, in a review mode, as a user is reproducing an image taken in the past (a storage image), the user hopes that an application usable for arranging or processing of stored images is recommended.

Thus, as a suitable application is different depending on a state of the imaging apparatus 1, the recommendation system according to the present embodiment decides an application to recommend based on metadata, etc. of an image selected in accordance with an operation mode of the imaging apparatus 1.

This enables the server 4 (recommendation apparatus) according to the present embodiment to quickly recommend an application suitable for the current state of the imaging apparatus 1. In addition, this enables the user to download an application currently required in the imaging apparatus 1.

The outline of the recommendation system according to an embodiment of the present disclosure has been discussed in the above. Hereinafter, a detailed description will be given regarding a basic configuration of each device included in the recommendation system according to an embodiment of the present disclosure.

FIG. 1 illustrates a digital camera as an example of the imaging apparatus 1; however, the imaging apparatus according to the present embodiment is not limited thereto. The imaging apparatus may be, for example, a notebook PC having an imaging function, a smartphone, personal digital assistants (PDA), a mobile phone, a portable music reproduction device, a portable video processing device or a portable game machine.

<2. Basic Configuration>
(2-1. Configuration of an Imaging Apparatus)

Figure 2:
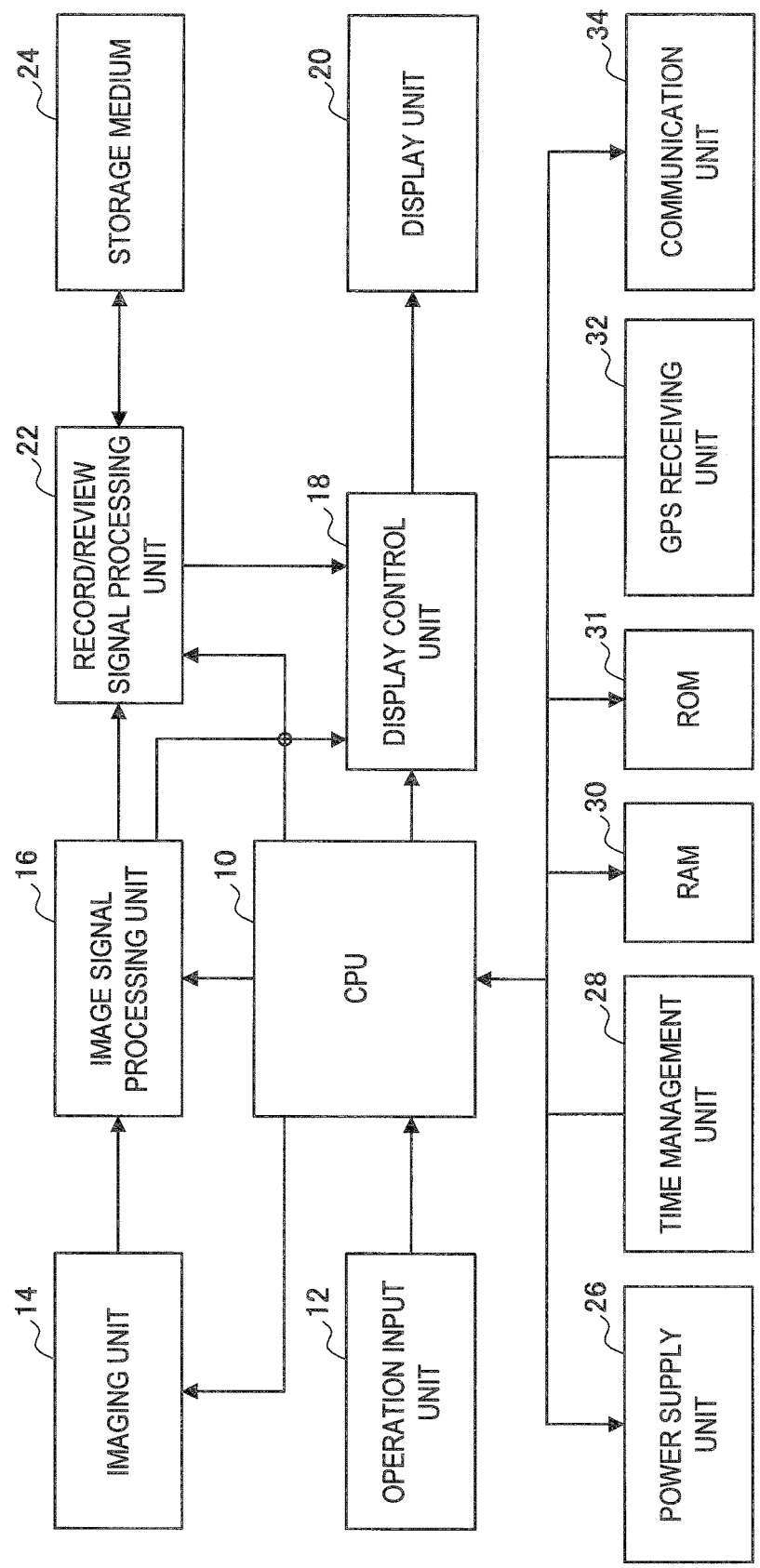
FIG. 2 is a block diagram illustrating a configuration of an imaging apparatus according to the embodiment.

FIG. 2 is a block diagram illustrating a configuration of an imaging apparatus 1 according to the present embodiment. As illustrated in FIG. 2, the imaging apparatus 1 according to the present embodiment includes a CPU 10, an operation input unit 12, an imaging unit 14, an image signal processing unit 16, a display control unit 18, a display unit 20, a record/review signal processing unit 22, a storage medium 24, a power supply unit 26, a time management unit 28, RAM 30, ROM 31, a GPS receiving unit 32, and a communication unit 34.

The CPU 10 is a control unit that controls each configuration of the imaging apparatus 1. The CPU 10 reads various programs stored in the later-described ROM 31, and performs various controls by using the RAM 30 as a work area.

For example, as illustrated in FIG. 2, in response to an operation signal output from the operation input unit 12, the CPU 10 outputs a control signal to the imaging unit 14, the image signal processing unit 16, the record/review signal processing unit 22, etc., and executes an imaging control, an image signal processing control, a storage control, a display control, etc.

Further, the CPU 10 of the present embodiment has a function to select an image in accordance with an operation mode, to transmit the metadata, etc. of the selected image to the server 4 (recommendation apparatus), and to download an application recommended by the server 4. The detailed functional configuration of the CPU 10 of the present embodiment will be described later with reference to FIG. 3.

The random access memory (RAM) 30 and the read only memory (ROM) 31 is a storage medium to be used when the CPU 10 is in operation. For example, the RAM 30 is used as a work area of the CPU 10, and the ROM 31 stores programs for the CPU 10 to execute the imaging control, the image signal processing control, the storage control, the display control, etc.

The operation input unit 12 detects an operation input by a user, outputs the operation input as an operation signal to the CPU 10. The operation input unit 12 detects the operation input by a user on physically structured buttons (a shutter button, a mode switch, a menu button, an operating lever or the like) or buttons displayed on the screen. The operation input on the screen may be detected, for example, by a touch panel having a display function and an operation input function. Here, the operation modes of the imaging apparatus 1 according to this embodiment include, as an example, a capture mode and a review mode. The user is allowed to operate a mode switch (not illustrated) to switch to an arbitrary operation mode (capture/review mode). In the case of the capture mode, the user is allowed to switch to any of capture modes including still, panorama, and motion.

The imaging unit 14 is a signal conversion unit such as a charge coupled device (CCD) or a complementary metal oxide semiconductor (CMOS), in which an object image is formed by an optical system. When the object image is formed in the signal conversion unit, the object image is converted into an electrical image signal by the signal conversion unit. Also, the imaging unit 14 is controlled by the CPU 10 in accordance with a capture mode switching operation of a user, and outputs an image signal of any of the still, panorama and motion. The image signal (captured image) converted by the imaging unit 14 is transmitted to the display unit 20 and the storage medium 24 through the image signal processing unit 16 or the like.

The image signal processing unit 16 processes the image signal output from the imaging unit 14. If necessary, the image signal processing unit 16 executes, for example, noise removal, color tone correction, brightness correction, edge detection, and the like. The image signal processing unit 16 outputs to the display control unit 18 the image signal output from the imaging unit 14.

Here, in the capture mode, image signals output from the imaging unit 14 and processed by the image signal processing unit 16 are sequentially displayed on the display unit 20. Such a series of processing in which image signals output from the imaging unit 14 are displayed sequentially (in real time) on the display unit 20 is referred to as through imaging, and also, images acquired by the through imaging (images displayed in real time) are referred to as a through image.

The image signal processing unit 16, for example, outputs an image signal to the record/review signal processing unit 22, in accordance with the timing of a shutter button operation.

In the capture mode, the record/review signal processing unit 22 stores in the storage medium 24, as a file, an image signal (captured image) output from the image signal processing unit 16 in accordance with the timing of the shutter button operation. In addition, according to the control by the CPU 10, the record/review signal processing unit 22 may store the captured image while adding, to the captured image, metadata including a capturing time and setting information at the time of capturing the image. Also, in the review mode, the record/review signal processing unit 22 reads the captured image stored in the storage medium 24 (hereinafter, also referred to as storage image), decodes and outputs the captured image to the display control unit 18.

The storage medium 24 is an image storage unit for storing a captured image, and is realized, for example, by a memory card. Also, the storage medium 24 according to the present embodiment may store a captured image and metadata as an image file, and further, may store index information based on all image files. The details of the storage medium 24 according to the present embodiment will be described later with reference to FIG. 4

According to the control signal outputted from the CPU 10, the display control unit 18 controls the display contents of the display unit 20. More specifically, in the capture mode, the display control unit 18, for example, performs control to display on the display unit 20 the captured image output from the image signal processing unit 16, in real time as a through image. In the review mode, the display control unit 18 performs control to display on the display unit 20 the storage image output from the record/review signal processing unit 22.

The display unit 20 is a display device such as a liquid crystal display (LCD) device and an organic light emitting diode (OLED) device. In response to a control by the display control unit 18, the display unit 20 according to the present embodiment displays a menu screen, a through image, a storage image or the like.

The power supply unit 26 includes a battery and a power supply circuit, and switches ON/OFF of power in response to a power control signal output from the CPU 10. The power supply unit 26 supplies electric power to each configuration of the imaging apparatus 1.

The time management unit 28 includes a clock circuit and manages date and time. For example, time information acquired by the time management unit 28 during capturing is added to a captured image as a capturing time.

The global positioning system (GPS) receiving unit 32 acquires the current positional information of the imaging apparatus 1. The GPS receiving unit 32 is capable of receiving navigation messages transmitted from three or more artificial satellites, to locate the current position based on the received navigation messages. The positional information acquired by the GPS receiving unit 32 may be added to the captured image as the information of the captured place.

The communication unit 34 is a communication interface for connecting to other communication devices. The communication unit 34 is capable of wired/wireless connection with other communication devices. The communication unit 34 of the present embodiment performs, for example, wireless LAN communication with the router 2, and transmits and receives data to and from the server 4 via the network 3.

Each configuration of the imaging apparatus 1 according to the present embodiment has been discussed above. Subsequently, there will be sequentially discussed in detail a functional configuration of the above CPU 10 (control unit) and stored contents of the storage medium 24. (Functional Configuration of CPU 10)

Figure 3:
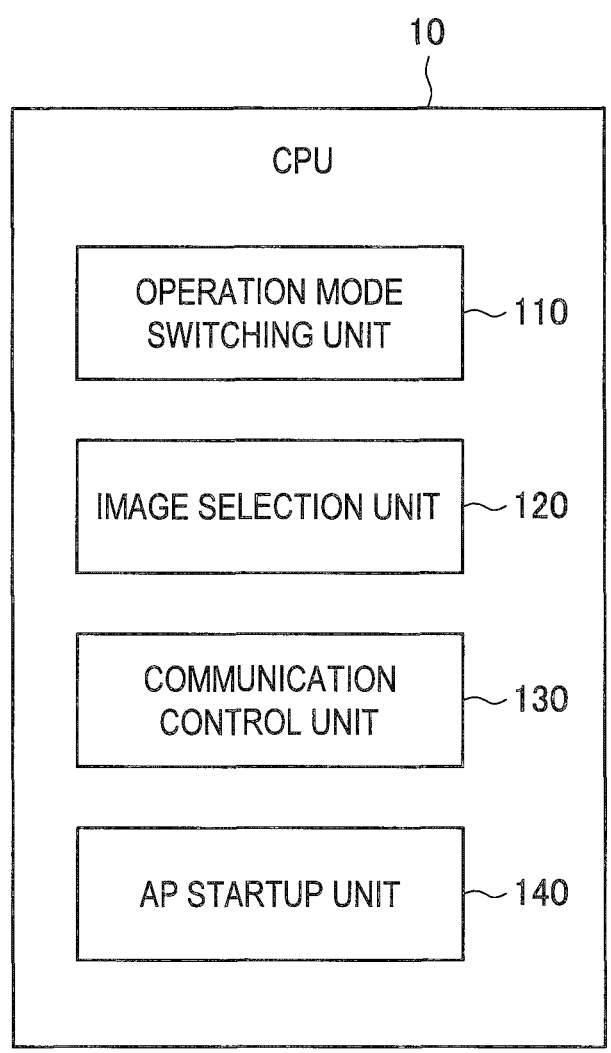
FIG. 3 is a block diagram illustrating a functional configuration of a CPU according to the embodiment.

FIG. 3 is a block diagram illustrating a functional configuration of a CPU 10 (control unit) according to the present embodiment. As illustrated in FIG. 3, the CPU 10 according to the present embodiment has functions of an operation mode switching unit 110, an image selection unit 120, a communication control unit 130, and an application (AP) startup unit 140.

The operation mode switching unit 110 switches an operation mode of the imaging apparatus 1 to a capture mode or a review mode according to an operation on the mode switch by a user. When switched to the capture mode, the CPU 10 controls the imaging unit 14, the image signal processing unit 16 and the display control unit 18, and performs through imaging. In addition, when switched to the review mode, the CPU 10 controls the record/review signal processing unit 22, the storage medium 24, and the display control unit 18, and controls so that a storage image read from the storage medium 24 or index information is displayed in the display unit 20.

The image selection unit 120 selects an image to use for determining the application to recommend in the server 4, in accordance with the operation mode of the imaging apparatus 1. Specifically, when the imaging apparatus 1 is in the capture mode, the image selection unit 120 selects a through image or a captured image recently taken. The captured image recently taken may be, for example, captured images of a predetermined number counted from the captured image with an added capturing time closest to the current time, or may be a captured image taken within the time period from the current time to the time going back by a predetermined time from the current time.

In this way, in the capture mode, the image selection unit 120 selects, as an image to use for determining an application to recommend, a through image or a captured image taken recently. Thus, the server 4 (recommendation apparatus) is capable of recommending an application more suitable for a situation in which the user is about to capture an image.

Meanwhile, if the imaging apparatus 1 is in the review mode, the image selection unit 120 selects all storage images that are stored in the storage medium 24, or part of the storage images currently displayed on the display unit 20. The part of the storage image currently displayed on the display unit 20, for example, may be one screenful of storage image being reproduced on the display unit 20, or may be a storage image group in index display on the display unit 20 (a plurality of storage images displayed on the screen in the review mode). The image selection unit 120 may select, based on the captured date and time of each stored image, a unit of images clustered according to day, week, month, position, or time, as the part of storage images stored in the storage medium 24.

In this manner, in the review mode, the image selection unit 120 selects all or part of the storage images stored in the storage medium 24, as an image to use for determining an application to recommend. Thus, the server 4 (recommendation apparatus) is enabled to recommend an application that matches the characteristics of the images frequently taken by the user. Further, selecting the currently reviewed image allows the server 4 to recommend an application suitable for displaying and processing the image currently reviewed or for capturing a similar image.

The communication control unit 130 controls such that the communication unit 34 transmits to the server 4 information on an image selected by the image selection unit 120, and that recommendation of an application by the server 4 is requested. Specifically here, the information on an image is, for example, metadata added to a captured image (face information, processing information, captured position information, etc.), a scene recognition result of a through image and the like, and also referred to as "metadata, etc. of an image" in the present specification. The detailed contents of the metadata will be described later with reference to FIG. 5.

However, in the capture mode, the communication control unit 130 may transmit to the server 4 information on a setting state of the imaging apparatus 1 set by a user in addition to an image selected by the image selection unit 120. The information on the setting state of the imaging apparatus 1 is information of a scene selection setting or a picture effect setting set by the user. The server 4 is thus able to recommend an application more suitable for the situation in which the user is currently going to capture an image.

The communication control unit 130 receives (downloads) an application recommended by the server 4 in response to a request from the imaging apparatus 1.

The AP startup unit 140 performs control to start up the application received (downloaded) from the server 4.

(Storage Medium 24)

Next, detailed description will be given on contents stored in the storage medium 24 according to the present embodiment, with reference to FIGS. 4 and 5.

FIG. 4 is a diagram illustrating an example of information stored in the storage medium 24 according to the present embodiment. As illustrated in FIG. 4, index information 241 and image files 242-1 through 242-N (image files 242) are stored in the storage medium 24. The index information is generated based on all the image files 242-1 through 242-N stored in the storage medium 24.

Further, as illustrated in FIG. 4, the image files 242-1 through 242-N include each piece of the metadata 244-1 through 244-N (metadata 244) and the image data (captured image) 246-1 through 246-N (image data 246). The metadata 244 is information relating to the image data 246 and includes captured time, captured position information, settings at the capturing, and the like. Detailed description will be given below with reference to FIG. 5.

FIG. 5 is an explanatory diagram illustrating a specific example of the metadata 244 according to the present embodiment. As illustrated in FIG. 5, for example, still image metadata 244A in a case where the image data 246 is of a still image includes Face Information, Capture Mode, Consecutive Capturing, Photo Processing, and Positional Information.

The term "Face Information" represents information indicating the position (x, y) and the size (w, h) of each face in an image, being a result of face recognition of image data 246. The "Capture Mode" represents information indicating, of full auto, programmed auto, aperture priority, shutter speed priority and manual, which capture parameter has been set at the capturing, being a method of setting a capture parameter. The "Consecutive Capturing" represents information on the existence of consecutive capturing at the time of capturing images, and includes, if there exists consecutive capturing, a consecutive capturing group ID for identifying each consecutive capturing. The "Photo Processing" represents information indicating whether the image data 246 has been processed or not, and, if processed, may include information on an application having been used for the processing. The "Positional Information" represents information indicating the latitude and longitude of a captured location.

As illustrated in FIG. 5, motion image metadata 244B in a case where the image data 246 is of a motion image, for example, includes Face Information, Capture Mode and Positional Information.

The definitions of "Face Information", "Capture Mode", and "Positional Information" are the same as those of the still image metadata 244A described above; however, the "Face Information" includes a timestamp indicating at which point the face is in the motion image. The "Positional Information" includes a timestamp indicating at which point the latitude and longitude is in the motion image, and the latitude and longitude of the representative position.

(2-2. Configuration of Server)

Figure 6:
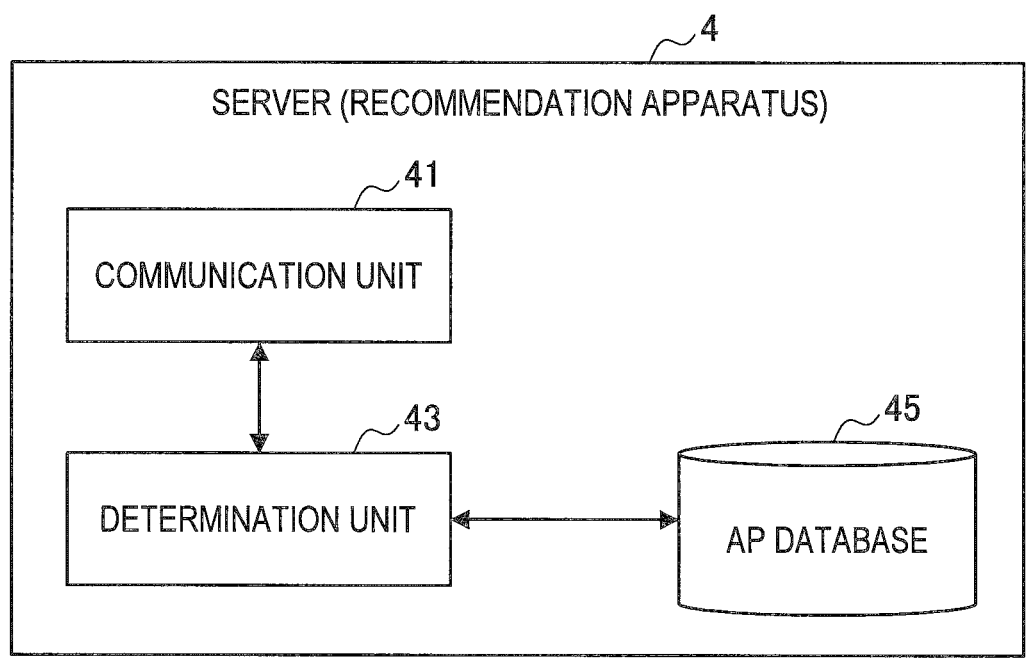
FIG. 6 is a block diagram illustrating a functional configuration of a server according to the embodiment.

Next, detailed description will be given on the configuration of a server 4 (recommendation apparatus) according to the present embodiment with reference to FIG. 6. FIG. 6 is a block diagram illustrating a functional configuration of the server 4 according to the present embodiment. As illustrated in FIG. 6, the server 4 includes a communication unit 41, a determination unit 43, and an application (AP) database 45.

(Communication Unit 41)

The communication unit 41 has a function of performing data communication with an external device, and in this embodiment, transmits and receives data to and from the imaging apparatus 1 via the network 3. In particular, the communication unit 41 receives metadata, etc. of a selected image from the imaging apparatus 1, and also transmits to the imaging apparatus 1 an application to recommend which is determined based on the received metadata, etc.

(Determination Unit 43)

The determination unit 43 determines an application to recommend, based on the metadata, etc. of an image selected by the imaging apparatus 1 and received from the communication unit 41. Furthermore, when utilizing metadata of a plurality of images, the determination unit 43 may determine an application to recommend based on statistics of the metadata. Below, detailed description will be given on the determination of an application to recommend by the determination unit 43 in accordance with the operation mode (capture/review mode) of the imaging apparatus 1.

—At Capture Mode

If the imaging apparatus 1 is in the capture mode, the determination unit 43 determines an application to recommend on the basis of information on a through image or a captured image recently taken. Thus, the determination unit 43 is able to recommend an application more suitable for a situation in which the user is about to capture an image.

More specifically, the determination unit 43 may determine an application to recommend, for example, to be as follows:

(a) If a scene recognition result of a through image is a "portrait mode" . . . Beautiful skin image capturing application; and (b) If there are a lot of people in recently captured images . . . Beautiful skin image capturing application.

Herein, with regard to the definition "if there are a lot of people in recently captured images" described in the above (a), if "the number of pieces of face information divided by the number of images" exceeds a threshold value in a subject group of images, based on, for example, each piece of metadata of an object image group, the determination unit 43 may determine that there are a lot of people.

Further, the determination unit 43 according to the present embodiment may determine an application to recommend based on information on a setting state of the imaging apparatus 1 set by a user, as follows:

(c) Scene selection setting . . . Scene addition application; and (d) Picture effect . . . Effect addition application.

—At Review Mode

If the imaging apparatus 1 is in the review mode, the determination unit 43 determines an application to recommend based on information on all or part of storage images stored in the storage medium 24. This enables the determination unit 43 to recommend an application that matches the characteristics of images that a user captures frequently.

Further, the determination unit 43 may extract (calculate statistics of) a feature of a storage image group selected in the review mode based on metadata of the storage images, to be as follows:

(I) A lot of portrait images, if "the number of pieces of face information divided by the number of images" in a target image group exceeds a threshold value;

(J) A lot of auto mode capturing, if "the number of fully automatically captured images divided by the number of images" in a target image group exceeds a threshold value;

(K) A lot of consecutively captured images, if "the number of consecutively captured still images divided by the number of still images" in a target image group exceeds a threshold value;

(L) A lot of photos processed with a photo processing application, if "the number of processed still images divided by the number of still images" in a target image group exceeds a threshold value; and (M) Images taken at various locations, if the variance of still image positional information and motion image representative positional information of a target image group exceeds a threshold value.

The determination unit 43 may determine an application to recommend based on the extracted feature of the storage image group, as follows:

(i) A lot of portrait images . . . Beautiful skin processing application;

(j) A lot of auto mode capturing . . . Capture guide application;

(k) A lot of consecutively captured images . . . Consecutive image organizing application;

(l) A lot of photos processed with a photo processing application . . . Other photo processing application; and (m) Images taken at various locations . . . Application for displaying photos on a map based on positional information.

(AP Database 45)

An AP database 45 is a storage unit for storing a variety of applications that can be downloaded to the imaging apparatus 1. For example, an AP database 25 stores a beautiful skin image capturing application, a scene addition application, a beautiful skin processing application, a capture guide application, and the like.

In the configuration illustrated in FIG. 6, the determination unit 43 of the server 4 determines an application to recommend from the AP database 45; however determination processing of the determination unit 43 of the present embodiment is not limited thereto. For example, the determination unit 43 may determine an application to recommend from an unspecified number of AP storage servers on the network 3.

<3. Operation Processing>

Figure 7:
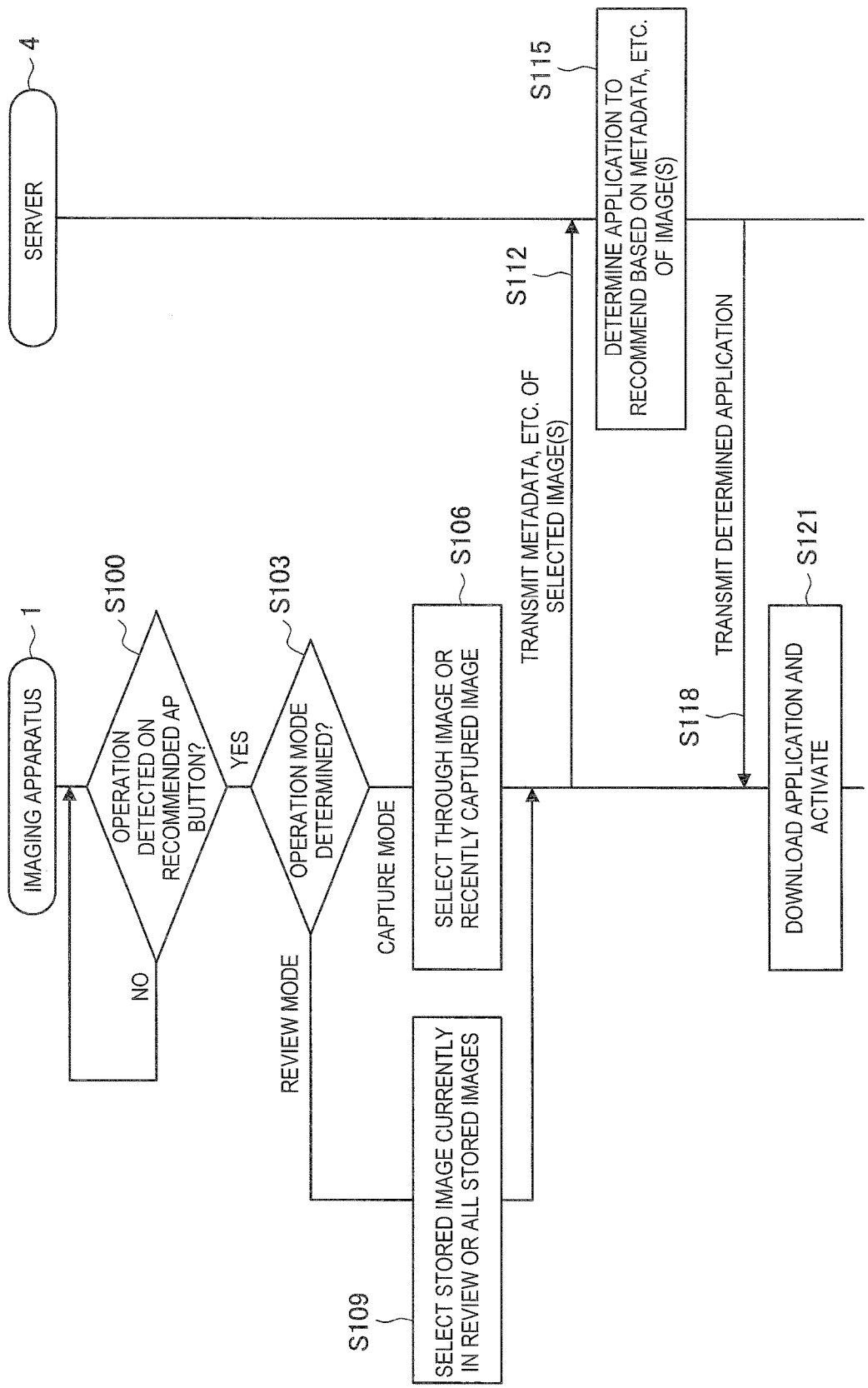
FIG. 7 is a flowchart illustrating operation processing of the recommendation system according to the embodiment.

Next, operation processing of a recommendation system according to the present embodiment will be described with reference to FIG. 7. FIG. 7 is a flowchart illustrating the operation processing of the recommendation system according to the present embodiment.

As illustrated in FIG. 7, first, in step S100, when an operation on a recommended application (AP) button is detected by the operation input unit 12 of the imaging apparatus 1, processing of the recommendation system according to the present embodiment is started. The recommended AP button may be a button physically structured, or may be a button displayed on the screen.

Figure 8:
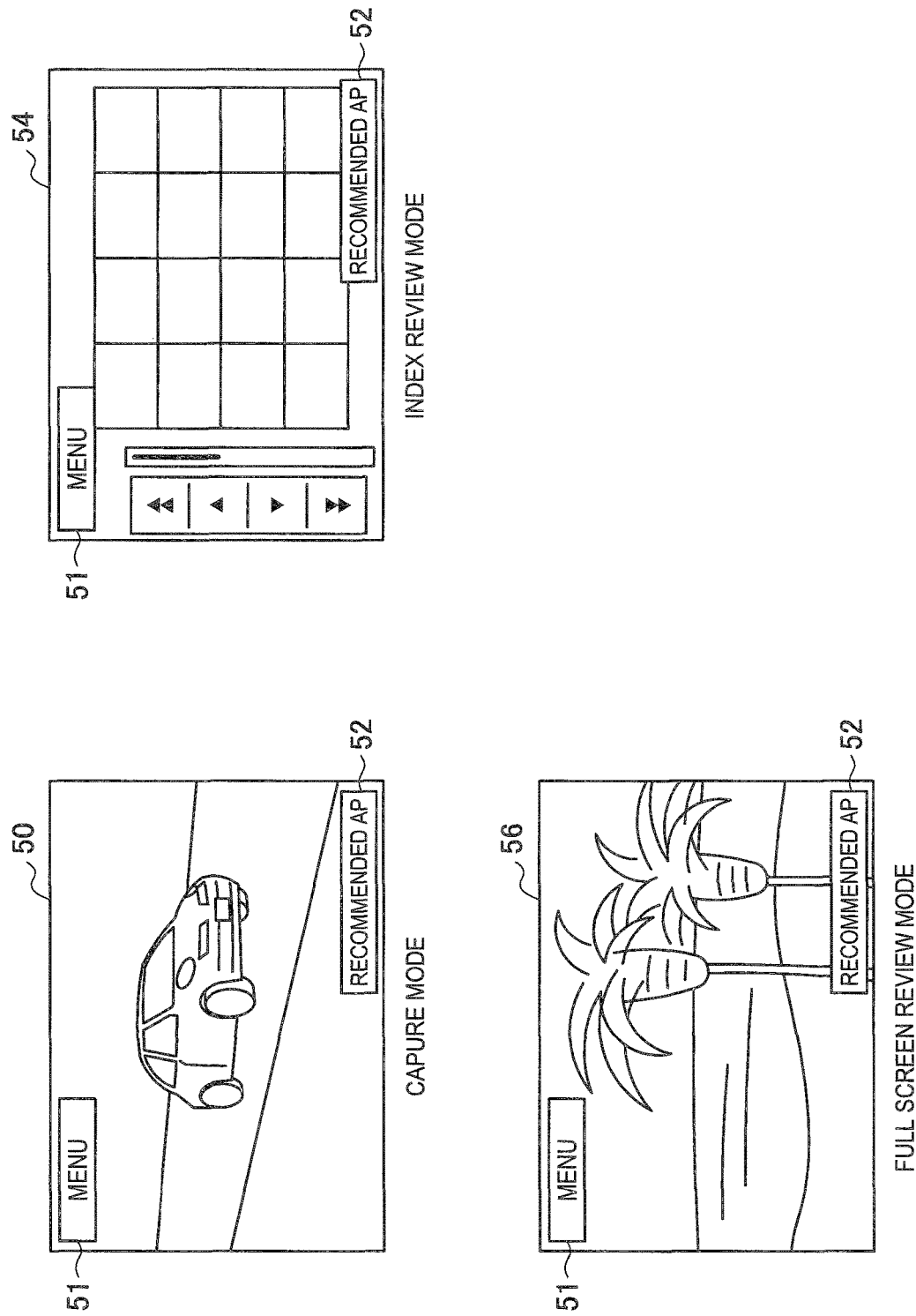
FIG. 8 is an explanatory diagram illustrating recommended AP buttons displayed on a screen.

In FIG. 8 are illustrated examples of a recommended AP button displayed on a screen. As illustrated in FIG. 8, in a capture mode, a through image 50 is displayed on the display unit 20, and a MENU button 51 and further a recommended AP button 52 are displayed. In addition, among review modes, in an index review mode for displaying the indexes of storage images, an index screen 54 is displayed on the display unit 20, and a MENU button 51 and further a recommended AP button 52 are displayed. Further, among the review modes, in a full-screen review mode for displaying a storage image on an entire screen, a storage image 56 is displayed on the display unit 20, and the MENU button 51 and further the recommended AP button 52 are displayed.

In this way, as a recommend AP button 52 is displayed in each operation mode, a user touches and operates the recommended AP button 52 if the user desires to download an application that is suitable for the current state of the imaging apparatus 1.

Then, in step S103, the image selection unit 120 determines an operation mode of the imaging apparatus 1.

Then, in step S106, the image selection unit 120 selects a through image or a captured image recently taken, when the operation mode of the imaging apparatus 1 is the capture mode.

On the other hand, in step S109, the image selection unit 120 selects a storage image currently reviewed or all storage images, in a case that the operation mode of the imaging apparatus 1 is the review mode.

In step S112, the communication control unit 130 transmits to the server 4 the metadata, etc. of the image selected by the image selection unit 120.

Next, in step S115, the determination unit 43 of the server 4 determines an application to recommend based on the received metadata of the image.

Next, in step S118, the communication unit 41 transmits the determined application to the imaging apparatus 1.

Then, in step S121, the communication unit 34 of the imaging apparatus 1 downloads the application, and the AP startup unit 140 starts up the downloaded application.

Thus, if a user touches a recommended AP button 52 displayed on the display unit 20 of the imaging apparatus 1 (see FIG. 8), an application suitable for the current situation of the imaging apparatus 1 is automatically downloaded and started up. Thus, the recommendation system according to the present embodiment enables a suitable application to be more quickly provided when capturing or reviewing an image.

(Supplement 1)

The operation processing of the recommendation system illustrated in FIG. 7 automatically downloads and activates an application to recommend which is determined by the determination unit 43 in steps S115 through S 121; however, the operation processing of the recommendation system according to the present disclosure is not limited thereto. For example, in step S115, the determination unit 43 may determine a plurality of applications to recommend.

In such a case, the communication unit 41 may transmit information on the plurality of determined applications to the imaging apparatus 1. Then, the display control unit 18 of the imaging apparatus 1 performs control to generate a selection screen based on the information on the plurality of received applications and to display the selection screen on the display unit 20.

Figure 9:
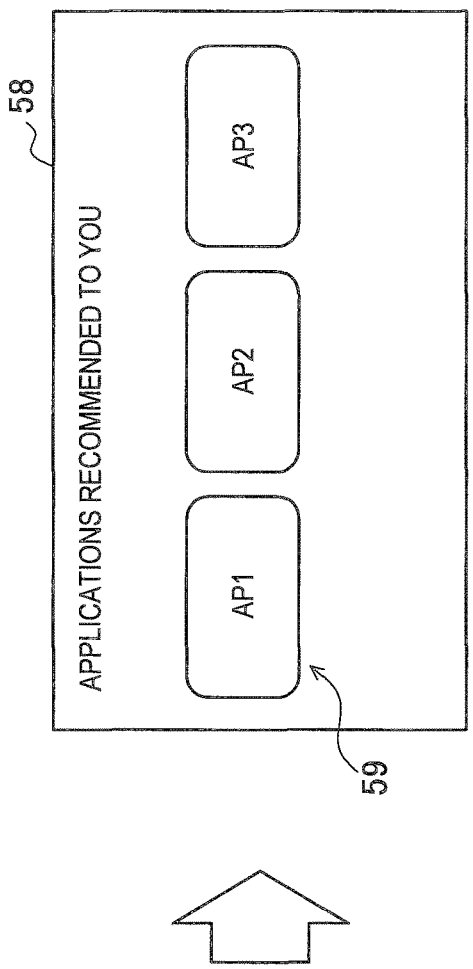
FIG. 9 is a diagram illustrating an example of a selection screen for recommended applications.

As illustrated in FIG. 9, for example, if the recommended AP 52 displayed along with the storage image 56 in the full-screen review mode is touched, a selection screen 58 including a display of a plurality of AP selection buttons 59 is displayed, along with a guide display such as "applications recommended to you." In addition, as information on each application, the display control unit 18 may also display the name, function and information of charge/free of the application.

This enables the user to select an arbitrary application from the recommended applications. Also, the imaging apparatus 1 downloads and activates the selected application.

(Supplement 2)

The recommendation system according to the present embodiment described above referring to FIGS. 7 through 9 starts the operation processing when an operation is performed on the "recommended AP button 52" displayed with the through image or storage image; however, the recommendation system according to the present disclosure is not limited thereto.

For example, as illustrated in FIG. 10, when a MENU button 51 displayed together with a storage image 57 is operated, the display control unit 18 displays a MENU screen 60 on the display unit 20. When an AP download button 62 included in the MENU screen 60 is selected, the operation processing by the recommendation system may be started.

In this case, the imaging apparatus 1 may automatically download an application to recommend which is determined by the determination unit 43 of the server 4, as described above, or may display a selection screen 58 as illustrated in FIG. 10 and allow the user to select an application to download.

<4. Summary>

As described above, in the recommendation system according to the present embodiment, it is possible to provide an appropriate application suitable for a situation when capturing or reviewing an image.

Specifically, when the imaging apparatus 1 is in the capture mode, the determination unit 43 determines an application to recommend based on information on a through image or captured image recently taken. This enables the determination unit 43 to recommend an application more suitable for a situation in which the user is about to capture an image.

Further, when the imaging apparatus 1 is in the review mode, the determination unit 43 determines an application to recommend based on information on all or part of storage images stored in the storage medium 24. This enables the determination unit 43 to recommend an application that matches the characteristics of images that a user frequently captures.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the recommendation system illustrated in FIG. 1 includes an imaging apparatus 1 and a server 4, and the server 4 determines an application to recommend based on metadata, etc. of an image transmitted from the imaging apparatus; however, the configuration of the recommendation system according to the present disclosure is not limited to the example illustrated in FIG. 1.

For example, it is also possible to determine an application to recommend based on metadata, etc. of a selected image within the imaging apparatus. In this case, the imaging apparatus (recommendation apparatus) may search and retrieve the determined application to recommend (for example, a beautiful skin image capturing application, etc.) from the network 3.

Further, the imaging apparatus (recommendation apparatus) may activate a determined application to recommend after automatically downloading (DL) the determined application to recommend, or may display information on determined applications to recommend and allow the user to select an application to start and DL.

Additionally, the present technology may also be configured as below.

(1)

A recommendation apparatus including
a determination unit configured to determine an application to be recommended to an imaging apparatus, based on information on an image selected in accordance with an operation mode of the imaging apparatus.

(2)

The recommendation apparatus according to (1), wherein the information on the image is one of metadata added to the image and a scene recognition result of a through image.

(3)

The recommendation apparatus according to (1), wherein the image is a predetermined picked-up image or a through image at an imaging mode.

(4)

The recommendation apparatus according to (3), wherein the predetermined picked-up image is a picked-up image imaged within a certain time period from current time to past, or a certain amount of picked-up images having closer imaging time to the current time, during the imaging mode.

(5)

The recommendation apparatus according to any one of (1) to (4), wherein the determination unit determines the application to be recommended to the imaging apparatus based on information on a setting state of the imaging apparatus set by a user in the imaging mode.

(6)

The recommendation apparatus according to any one of (1) to (5), wherein the image is a predetermined storage image stored in the imaging apparatus, in a review mode.

(7)

The recommendation apparatus according to (6), wherein the predetermined storage image is a plurality of storage images displayed on a screen in the review mode.

(8)

The recommendation apparatus according to (6), wherein the predetermined storage image is a storage image currently in review or all storage images stored in the imaging apparatus.

(9)

The recommendation apparatus according to (8), wherein the determination unit determines the application to be recommended to the imaging apparatus based on statistics of information on the all storage images stored in the imaging apparatus.

(10)

The recommendation apparatus according to any one of (1) to (9), further including:

a reception unit configured to receive from the imaging apparatus the image selected according to the mode of the imaging apparatus or the information on the selected image; and a transmission unit configured to transmit to the imaging apparatus the application determined by the determination unit.

(11)

The recommendation apparatus according to any one of (1) to (9), wherein the recommendation apparatus is the imaging apparatus further including:

an imaging unit;

a display unit; and a display control unit configured to perform control to display on the display unit information on the application determined by the determination unit.

(12)

The recommendation apparatus according to (11), further including:

an operation detection unit configured to detect a selection operation of a user for information on a plurality of applications displayed on the display unit; and a control unit configured to perform control to start up an application selected by the user.

(13)

The recommendation apparatus according to any one of (1) to (9), wherein the recommendation apparatus is the imaging apparatus further including:

an imaging unit; and a control unit configured to perform control to start up the application determined by the determination unit.

(14)

A recommendation method including:

a step of selecting an image in accordance with an operation mode of an imaging apparatus; and a step of determining an application to be recommended to the imaging apparatus based on information on the image selected by the step of selecting.

(15)

A program for causing a computer to execute:

processing of selecting an image in accordance with an operation mode of an imaging apparatus; and processing of determining an application to be recommended to the imaging apparatus based on information on the image selected by the processing of selecting.

REFERENCE SIGNS LIST 1 imaging apparatus
2 router
3 network
4 server
10 CPU
12 operation input unit
14 imaging unit
16 image signal processing unit
18 display control unit
20 display unit
22 record/review signal processing unit
24 storage medium
241 index information
242 (242-1 through 242-N) image files
244 (244-1 through 244-N) metadata
244A still image metadata
244B motion image metadata
246 (246-1 through 246-N) image data
26 power supply unit
28 time management unit
30 RAM
31 ROM
32 GPS receiving unit
34 communication unit
110 operation mode switching unit
120 image selection unit
130 communication control unit
140 AP startup unit

The invention claimed is:

1. An imaging apparatus, comprising:

an imaging sensor configured to capture a plurality of images that includes at least one through image;

a display screen configured to display a first through image of the at least one through image at a time of capture of the first through image; and a Central Processing Unit (CPU) configured to:

transmit, to a recommendation apparatus, the first through image and first information associated with a setting state of the imaging apparatus in an imaging mode, wherein the first information includes at least scene selection setting information of the imaging apparatus, and wherein the image sensor is further configured to capture the plurality of images based on the setting state;

receive, from the recommendation apparatus, a plurality of applications, wherein the plurality of applications are based on the first through image and the first information;

control the display screen to display the plurality of applications;

select a first application of the plurality of applications based on a user operation; and control the image sensor to capture a new image based on the first application.

2. The imaging apparatus according to claim 1, wherein the plurality of images further include at least one captured image.

3. The imaging apparatus according to claim 2, wherein the image sensor is configured to capture the captured image in a specific time period from a current time to a past time.

4. The imaging apparatus according to claim 1, further comprising a storage medium configured to store a first set of images of the plurality of images.

5. The imaging apparatus according to claim 4, wherein a second set of images of the first set of images are images displayed on the display screen in a review mode.

6. The imaging apparatus according to claim 4, wherein at least one image of the first set of images is an image that is currently in review.

7. The imaging apparatus according to claim 6, wherein the CPU is further configured to receive the plurality of applications based on statistics of second information associated with the first set of images.

8. The imaging apparatus according to claim 1, wherein the CPU is further configured to control the display screen to display second information associated with the plurality of applications.

9. The imaging apparatus according to claim 8, wherein the CPU is further configured to detect a user selection of the second information.

10. The imaging apparatus according to claim 1, wherein the first through image is one of a motion image or a panorama image.

11. The imaging apparatus according to claim 1, wherein the CPU is further configured to:
    receive the plurality of applications, in a review mode, based on a feature associated with a set of images of the plurality of images,
    wherein the feature is extracted based on a number of images among the set of images and a threshold value.

12. A method, comprising:
    in an imaging apparatus:
        capturing a plurality of images that includes at least one through image;
        displaying a first through image of the at least one through image at a time of the capture of the first through image;
        transmitting, to a recommendation apparatus, the first through image and first information associated with a setting state of the imaging apparatus in an imaging mode,
        wherein the first information includes at least scene selection setting information of the imaging apparatus, and
        wherein the capturing of the plurality of images is based on the setting state of the imaging apparatus;
        receiving, from the recommendation apparatus, a plurality of applications,
        wherein the plurality of applications are based on the first through image and the first information;
        displaying the plurality of applications;
        selecting a first application of the plurality of applications based on a user operation; and
        capturing a new image based on the first application.

13. A non-transitory computer-readable medium having stored thereon computer-executable instructions, which when executed by a computer, cause an imaging apparatus that includes the computer to execute operations, the operations comprising:
    capturing a plurality of images that includes at least one through image;
    displaying a first through image of the at least one through image at a time of the capture of the first through image;
    transmitting, to a recommendation apparatus, the first through image and first information associated with a setting state of the imaging apparatus in an imaging mode,
    wherein the first information includes at least scene selection setting information of the imaging apparatus, and
    wherein the capturing of the plurality of images is based on the setting state;
    receiving, from the recommendation apparatus, a plurality of applications,
    wherein the plurality of applications are based on the first through image and the first information;
    displaying the plurality of applications;
    selecting a first application of the plurality of applications based on a user operation; and
    capturing a new image based on the first application.

\* \* \* \* \*